US012504682B2

(12) United States Patent
Nakamura et al.

(10) Patent No.: US 12,504,682 B2
(45) Date of Patent: Dec. 23, 2025

(54) VEHICULAR CAMERA

(71) Applicant: PANASONIC INTELLECTUAL PROPERTY MANAGEMENT CO., LTD., Osaka (JP)

(72) Inventors: Ken Nakamura, Kanagawa (JP); Koyo Usami, Kanagawa (JP); Kazuhiro Abe, Tokyo (JP); Masayuki Yoshie, Aichi (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 157 days.

(21) Appl. No.: 18/434,402

(22) Filed: Feb. 6, 2024

(65) Prior Publication Data

US 2024/0272540 A1 Aug. 15, 2024

(30) Foreign Application Priority Data

Feb. 13, 2023 (JP) .................. 2023-020068

(51) Int. Cl.
*G03B 30/00* (2021.01)
*H04N 23/51* (2023.01)
*H04N 23/52* (2023.01)
*H04N 23/54* (2023.01)
*H04N 23/55* (2023.01)

(52) U.S. Cl.
CPC ............ *G03B 30/00* (2021.01); *H04N 23/51* (2023.01); *H04N 23/52* (2023.01); *H04N 23/54* (2023.01); *H04N 23/55* (2023.01)

(58) Field of Classification Search
None
See application file for complete search history.

(56) References Cited

U.S. PATENT DOCUMENTS

| 2016/0301837 | A1* | 10/2016 | Byrne | ............... | B60R 11/04 |
| 2019/0143907 | A1  | 5/2019  | Byrne et al. | | |
| 2024/0171834 | A1* | 5/2024  | Usui  | ............... | G03B 17/02 |
| 2025/0193503 | A1* | 6/2025  | Harada | .............. | H04N 23/55 |

FOREIGN PATENT DOCUMENTS

WO   WO-2022254982 A1 * 12/2022 ............ G03B 17/02

* cited by examiner

*Primary Examiner* — Rodney E Fuller
(74) *Attorney, Agent, or Firm* — Seed Intellectual Property Law Group LLP

(57) ABSTRACT

A vehicular camera includes a circuit board accommodated in a housing and a metal shield. The circuit board includes a first component disposed on a second surface and having a first height and a second component disposed on the second surface and having a second height smaller than the first height. The first component is disposed in a position opposite to a second bottom surface portion of a recessed portion of a first bottom surface portion of the shield, and the second component is disposed in a position opposite to a portion other than the recessed portion of the first bottom surface portion of the shield.

13 Claims, 8 Drawing Sheets

VEHICULAR CAMERA

CROSS-REFERENCE TO RELATED APPLICATIONS

This application is based on and claims priority under 35 USC 119 from Japanese Patent Application No. 2023-020068 filed on Feb. 13, 2023, the content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literature 1).

CITATION LIST

Patent Literature

Patent Literature 1: US2019/0143907A

SUMMARY OF INVENTION

Levels of demands for vehicle safety, autonomous driving functions and the like have been improving, and similar expectations are placed on vehicular cameras, including further improvements in their performance.

The present disclosure relates to a technique of providing a new vehicular camera.

A vehicular camera of the present disclosure includes at least one lens disposed along an optical axis; a lens barrel portion having a tubular shape and accommodating the at least one lens; a circuit board having a first surface and a second surface opposite to the first surface, the circuit board being disposed along a prescribed plane; an imaging element arranged on the first surface of the circuit board and disposed on the optical axis; a resin housing to which the lens barrel portion is fixed, the housing accommodating at least the circuit board; and a metal shield accommodated in the housing. The shield is disposed along the prescribed plane and includes at least a first bottom surface portion facing the second surface of the circuit board, the first bottom surface portion of the shield includes a first side surface portion surrounding the circuit board along a direction of the optical axis at a peripheral edge, and a recessed portion disposed inward of the peripheral edge, the recessed portion of the first bottom surface portion of the shield includes a second bottom surface portion and a second side surface portion, the second side surface portion connecting the second bottom surface portion and the first bottom surface portion at a peripheral edge of the second bottom surface portion, the second bottom surface portion of the recessed portion of the first bottom surface portion of the shield is disposed farther from the circuit board than the first bottom surface portion of the shield, the circuit board includes a first component disposed on the second surface and having a first height and a second component disposed on the second surface and having a second height smaller than the first height, the first component is disposed in a position opposite to the second bottom surface portion of the recessed portion of the first bottom surface portion of the shield, and the second component is disposed in a position opposite to a portion other than the recessed portion of the first bottom surface portion of the shield.

According to the present disclosure, in a vehicular camera, a distance between a first bottom surface portion of a shield and a circuit board can be reduced, and noise resistance can be improved since radio waves are less likely to fly in. The shield is adjacent to a ground of the circuit board, and thus a difference between a potential of the shield and a potential of the circuit board can be reduced, resonance can be prevented, and the ground can be stabilized.

DESCRIPTION OF EMBODIMENTS

Hereinafter, an embodiment that specifically discloses the vehicular camera according to the present disclosure will be described in detail with reference to the drawings as appropriate. Unnecessarily detailed description may be omitted. For example, detailed description of already well-known matters and redundant description of substantially the same configuration may be omitted. This is to avoid unnecessary redundancy of the following description and facilitate understanding by those skilled in the art. It should be noted that the accompanying drawings and the following description are provided for those skilled in the art to sufficiently understand the present disclosure, and are not intended to limit the subject matter described in the claims.

Figure 1A:
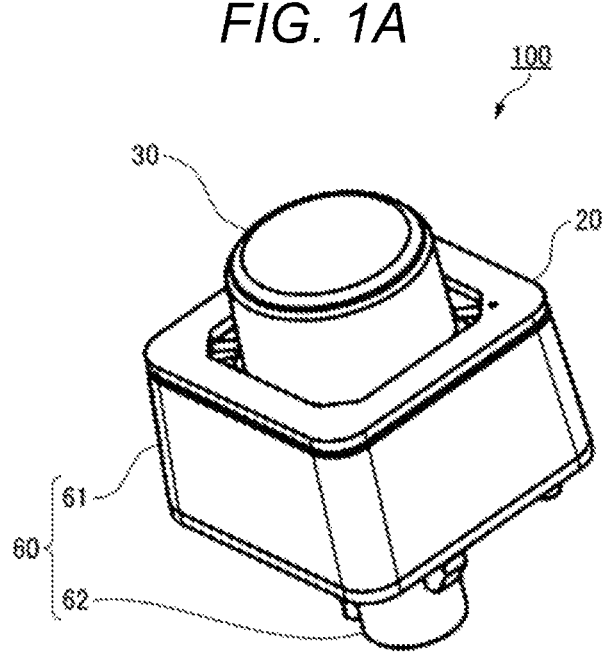
FIG. 1A is a top perspective view of a vehicular camera according to an embodiment.
Figure 1B:
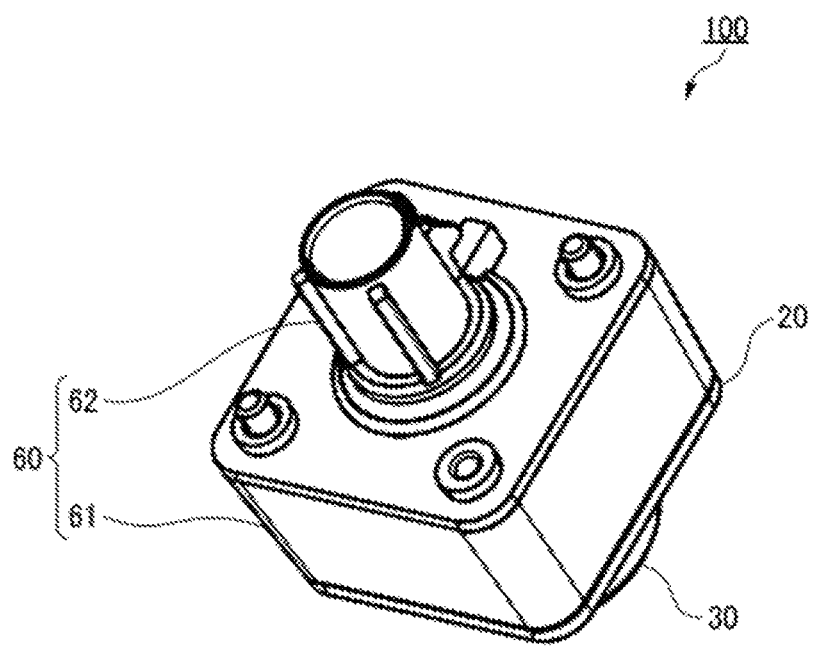
FIG. 1B is a bottom perspective view of the vehicular camera according to the embodiment.
Figure 2:
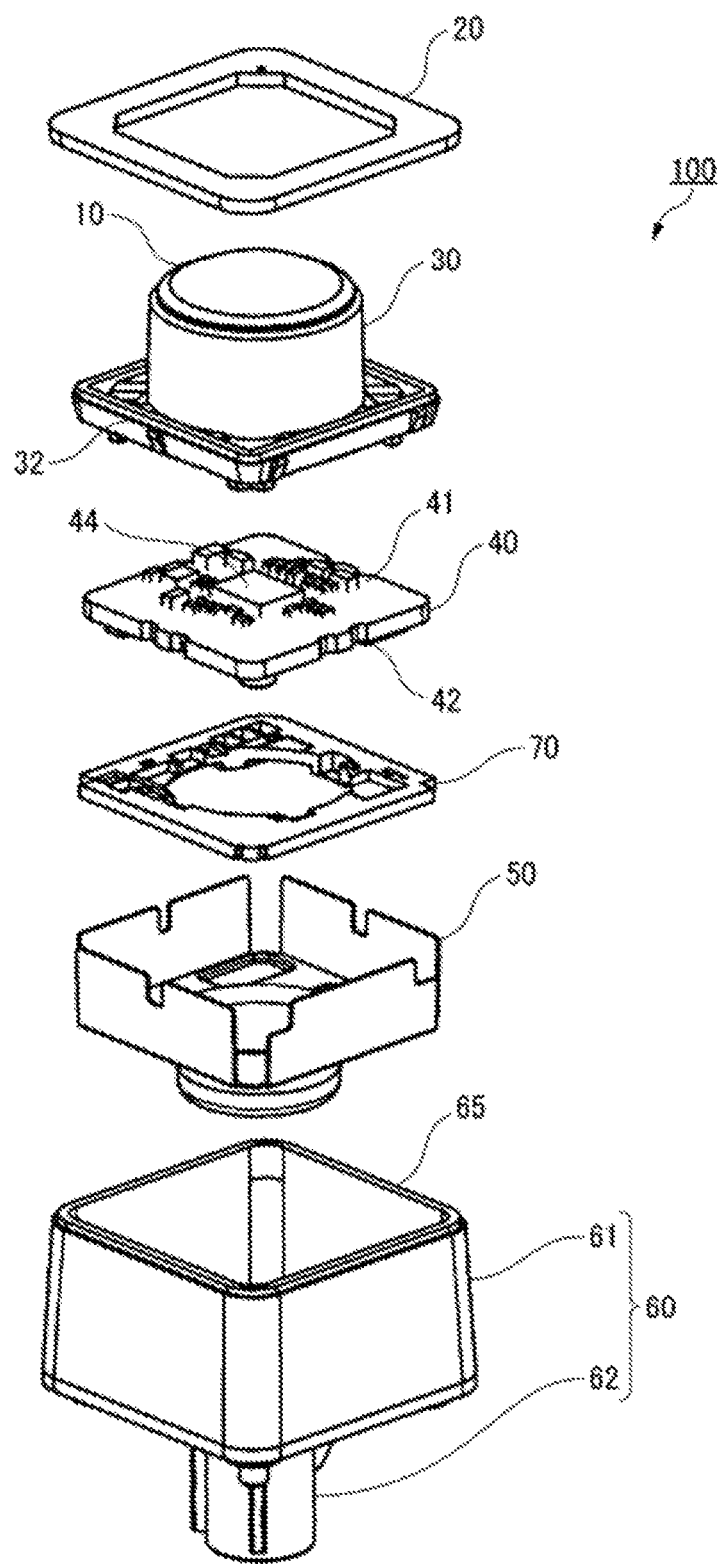
FIG. 2 is an exploded perspective view of the vehicular camera according to the embodiment.
Figure 3:
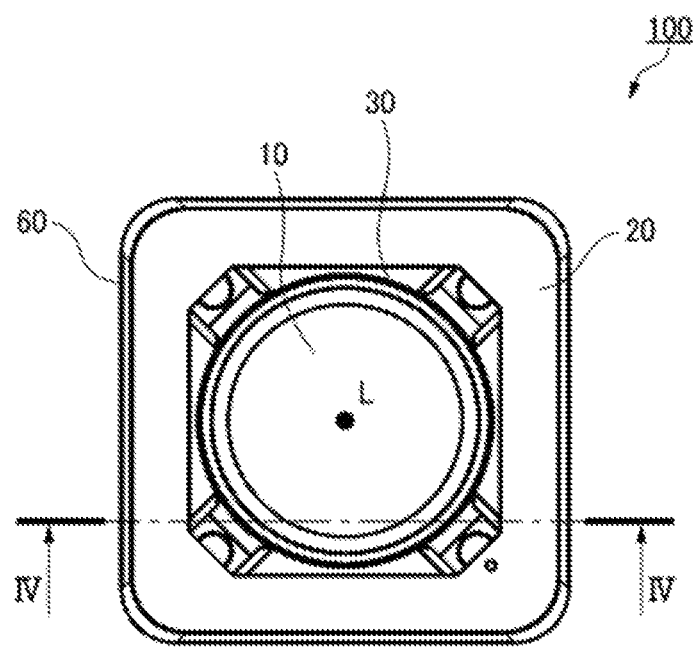
FIG. 3 is a top view of the vehicular camera according to the embodiment.
Figure 4:
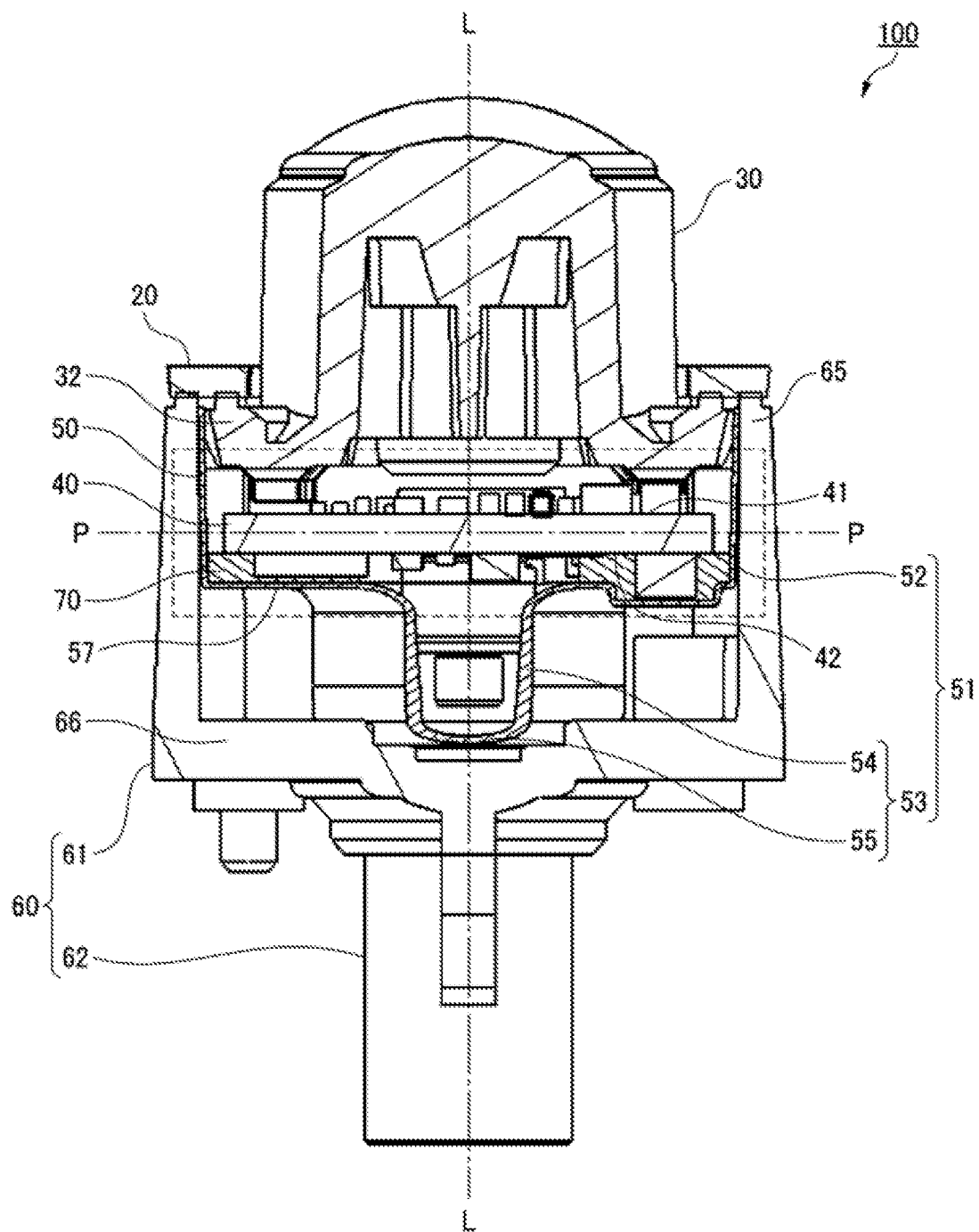
FIG. 4 is a cross-sectional view taken along a line IV-IV in FIG. 3.
Figure 5:
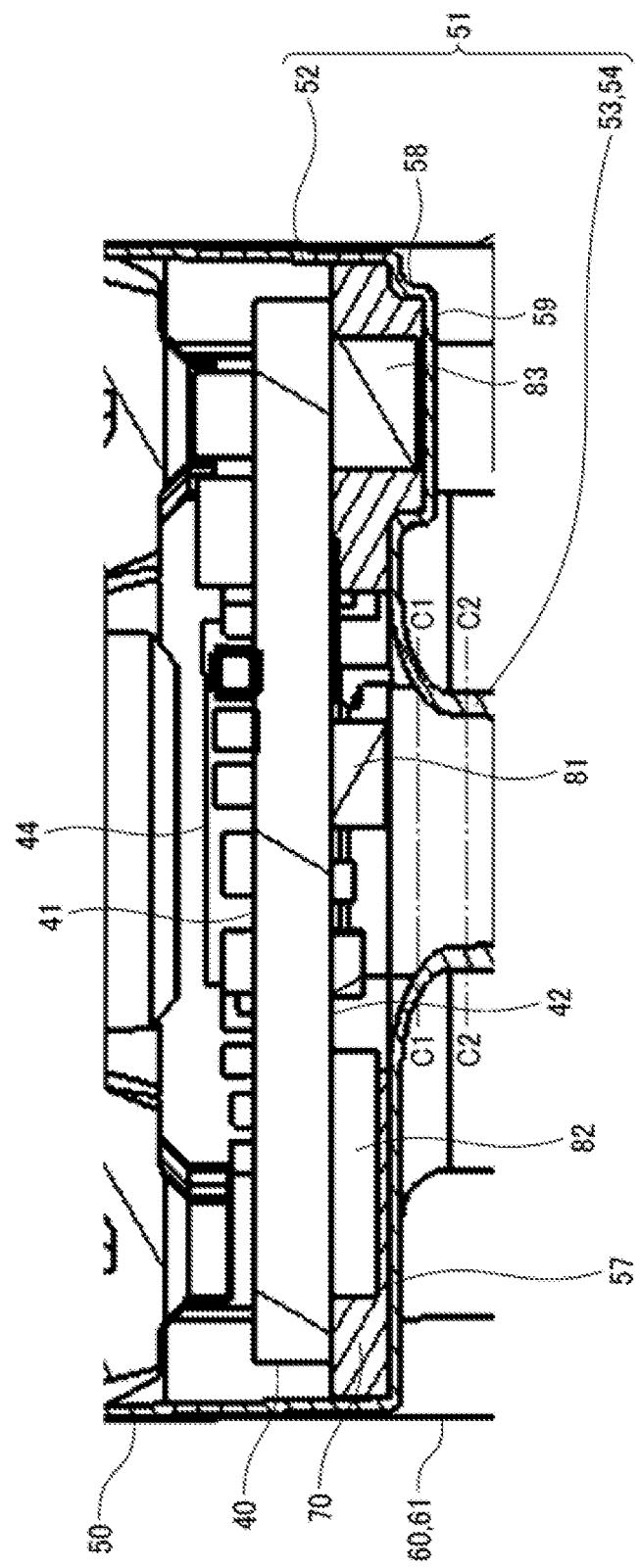
FIG. 5 is an enlarged view of a frame portion in FIG. 4.
Figure 6:
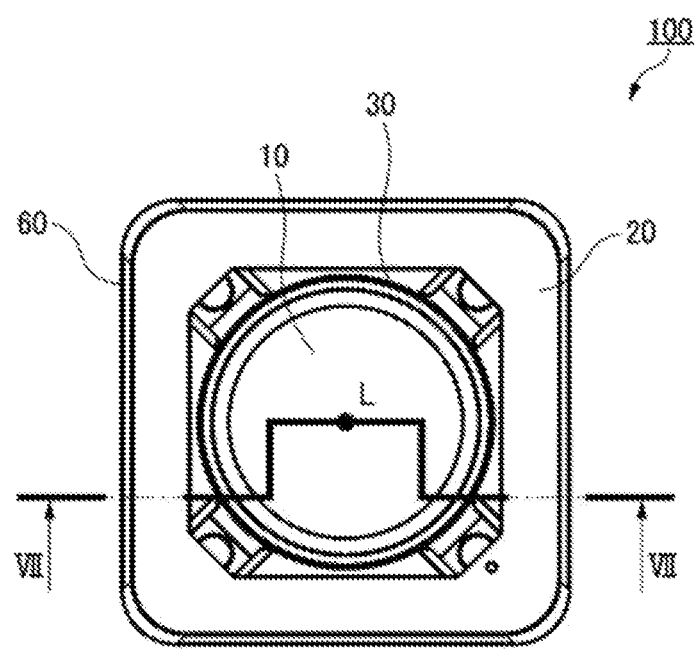
FIG. 6 is a top view of the vehicular camera according to the embodiment.

FIG. 1A is a top perspective view of a vehicular camera 100 according to an embodiment. FIG. 1B is a bottom perspective view of the vehicular camera 100 according to the embodiment. FIG. 2 is an exploded perspective view of the vehicular camera 100 according to the embodiment. FIG. 3 is a top view of the vehicular camera 100 according to the embodiment. FIG. 4 is a cross-sectional view taken along a line IV-IV in FIG. 3. FIG. 5 is an enlarged view of a frame portion in FIG. 4. FIG. 6 is a top view of the vehicular camera according to the embodiment.

The vehicular camera 100 is an imaging device that is installed at front and rear ends, left and right side surfaces and the like of a vehicle body of a vehicle and captures the inside and outside of the vehicle body of the vehicle. In recent years, development of the vehicular camera 100 has become active with demands for improvements in vehicle safety, introduction of autonomous driving functions and the like.

The vehicular camera 100 according to the present embodiment includes a lens 10, a lens barrel portion 30, a circuit board 40, an imaging element 44, a shield 50, and a housing portion 60. The vehicular camera 100 according to the present embodiment may further include a ring member 20 and a resin member 70 as illustrated in FIG. 2.

The lens barrel portion 30 has a tubular shape and accommodates at least one lens 10 therein. The lens 10 is disposed along an optical axis L (for example, see FIGS. 3,4, 6, and 7). When the lens 10 includes a plurality of lenses and the plurality of lenses are provided in the lens barrel portion 30, the lenses are disposed in a state in which the optical axes L thereof coincide with each other, and constitute a lens group used for capturing the inside and outside of the vehicle body of the vehicle.

The lens barrel portion 30 includes a flange portion 32. The flange portion 32 is located in a vicinity of an opening of an internal space of the housing portion 60 to be described later. At least a part of the flange portion 32 is joined to the housing portion 60 via the ring member 20 to be described later.

The lens barrel portion 30 is formed of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One or a plurality of types of resins may be used. A main resin may contain an absorbent that absorbs laser light, a coloring material, or both.

The circuit board 40 is disposed in the internal space of the housing portion 60 and has a first surface 41 facing the lens barrel portion 30 and a second surface 42 opposite to the first surface 41. The imaging element 44 is disposed on the first surface 41 of the circuit board 40 on the optical axis L of the lens 10 accommodated in the lens barrel portion 30, receives light passed through the lens 10, and captures an image based on the received light. Accordingly, data of the image captured by the vehicular camera 100 is formed (generated).

The ring member 20 has a rectangular annular flat plate shape in plan view, and is fixed to the lens barrel portion 30 and the housing portion 60. The ring member 20 is disposed around an entire circumference (that is, the entire circumference of the lens 10 about the optical axis L) of the lens barrel portion 30 and protrudes in a direction apart from the optical axis L of the lens 10.

The ring member 20 is formed of, for example, a polyester resin, a polyolefin resin, a polyamide resin, a vinyl chloride resin, or a fluorine resin. Examples of the polyester resin include polybutylene terephthalate (PBT) and polyethylene terephthalate (PET). Examples of the polyolefin resin include polyethylene and polypropylene. One or a plurality of types of resins may be used. In a case of using laser welding to be described later, a coloring material, a filler, or both may be contained in a main light transmitting resin as long as a transmission performance of a certain level or more can be achieved.

Although the ring member 20 is a flat plate having a rectangular annular shape in the present embodiment, the shape is not limited thereof as long as a welded portion has a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The housing portion 60 is a member having the internal space and having a tubular shape at least at a part thereof, and includes a large diameter tubular portion 61 and a small diameter tubular portion 62. The large diameter tubular portion 61 has a cross-sectional area larger than that of the small diameter tubular portion 62 when assuming a cross section in a plane orthogonal to the optical axis L, and has a rectangular cross section, so does the small diameter tubular portion 62. The large diameter tubular portion 61 accommodates at least the circuit board 40 therein. The small diameter tubular portion 62 mainly accommodates a connector (to be described later) that ensures electrical connection to the outside (for example, a control circuit component such as an electric control unit (ECU) disposed in the vehicle body of the vehicle to which the vehicular camera 100 is attached) of the vehicular camera 100. The large diameter tubular portion 61 and the small diameter tubular portion 62 may be integrally formed, and the large diameter tubular portion 61 and the small diameter tubular portion 62 prepared individually in advance may be joined by a method such as welding or screwing. Although the housing portion 60 has a rectangular tubular shape in the present embodiment, the shape is not limited thereto, and may be a polygonal tubular shape other than the rectangular tubular shape, a circular or elliptical tubular shape, or another tubular shape.

The housing portion 60 is formed of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One or a plurality of types of resins may be used. In a case of using laser welding to be described later, a main light absorbing resin may contain an absorbent that absorbs laser light, a coloring material, or both.

As illustrated in FIG. 4, the ring member 20 is fixed to the flange portion 32 of the lens barrel portion 30 and one end surface 65 of the housing portion 60. The fixing can be implemented by, for example, laser welding. Specifically, in the present embodiment, the one tubular end surface 65 of the housing portion 60 and the ring member 20 are fixed by laser welding by laser beams transmitted through the ring member 20. By the fixing using laser welding, the ring member 20 and the housing portion 60 can be easily and reliably fixed. Accordingly, the lens barrel portion 30 is fixed to the housing portion 60 via the ring member 20.

The shield 50 is a metal member accommodated in the housing portion 60. The shield 50 is a rectangular tubular member having an open upper surface (see FIG. 2), and is accommodated in a state of being in close contact with an inner surface of the housing portion 60. The shield 50 is a member for shielding components accommodated in the housing portion 60, particularly the circuit board 40, from external electromagnetic waves. Details of the shield 50 will be described later.

The resin member 70 is disposed between the second surface of the circuit board 40 and the shield 50 inside the tubular shape of the housing portion 60. The resin member 70 may be disposed by potting or implemented by a component formed in advance by injection molding or the like. In the present embodiment, the resin member 70 is molded in advance into a box-shaped member that fits the inside of the tubular shape of the housing portion 60. In particular, in the present embodiment, the resin member 70 mainly functions as a heat dissipation member in the internal space of the housing portion 60, which dissipates heat generated from the circuit board 40 to the outside of the housing portion 60, making it easy to avoid a failure of the vehicular camera 100.

A resin forming the resin member 70 is not particularly limited, and is desirably formed of a material containing at least silicone from a viewpoint of the heat dissipation described above. The silicone has a heat dissipation function, and can efficiently dissipate heat inside the housing portion 60.

Next, the shield 50 will be described in detail. As illustrated in FIG. 4, the circuit board 40 is disposed along a prescribed plane P inside the housing portion 60. The prescribed plane P is, for example, a plane orthogonal to the optical axis L of the lens 10.

The shield 50 is disposed along the prescribed plane P and includes at least a first bottom surface portion 51 facing the second surface 42 of the circuit board 40. The first bottom surface portion 51 includes a first side surface portion 52 surrounding the circuit board 40 along the direction of the optical axis L of the lens 10 at a peripheral edge, and a recessed portion 53 disposed inward of the peripheral edge.

The recessed portion 53 includes a second bottom surface portion 55 and a second side surface portion 54 connecting the second bottom surface portion 55 and the first bottom surface portion 51 at a peripheral edge of the second bottom surface portion 55. The second bottom surface portion 55 is disposed farther from the circuit board 40 than the first bottom surface portion 51 of the shield 50. The first bottom surface portion 51 includes, between the first side surface portion 52 and the recessed portion 53, a portion 57 other than the recessed portion. The portion 57 other than the recessed portion is, for example, a plane along the prescribed plane P. The second bottom surface portion 55 may also be disposed along the prescribed plane P.

The first side surface portion 52, the portion 57 other than the recessed portion of the first bottom surface portion 51, the second side surface portion 54 of the recessed portion 53, and the second bottom surface portion 55 of the recessed portion 53 are continuously formed. The shield 50 can be easily formed by drawing a metal plate or the like.

As illustrated in FIG. 5 in which a frame portion in FIG. 4 is enlarged, various components (electronic components) are disposed on the first surface 41 and the second surface 42 of the circuit board 40. In particular, in the present embodiment, the circuit board 40 includes a first component 81 disposed on the second surface 42 and having a first height and a second component 82 disposed on the second surface 42 and having a second height smaller than the first height of the first component 81.

The first component 81 is disposed in a position facing the second bottom surface portion 55 of the recessed portion 53 of the first bottom surface portion 51 of the shield 50. Here, "facing" includes both a case where a component such as a coaxial connector (described later) is present and a case where no component is present between the first component 81 and the second bottom surface portion 55. On the other hand, the second component 82 is disposed in a position facing the portion 57 other than the recessed portion of the first bottom surface portion 51 of the shield 50.

That is, the first component 81 having a larger height is disposed in a position facing the second bottom surface portion 55 that is apart from the circuit board 40, and the second component 82 having a smaller height is disposed in a position facing the portion 57 other than the recessed portion that is adjacent to the circuit board 40. According to this arrangement, a distance between the first bottom surface portion 51 of the shield 50 and the circuit board 40 can be reduced while preventing contact and interference between the first component 81 having a larger height and the shield 50, and noise resistance can be improved since radio waves (for example, in a kHz band) having wavelengths longer than this distance are less likely to fly in. With this arrangement, a distance (distance along the optical axis L direction) between the circuit board 40 and the portion 57 other than the recessed portion can be set to be a short distance of, for example, about 1 mm.

In addition, the circuit board 40 has a ground (for example, not only a metal surface of a surface layer but also a metal layer laminated in the board) serving as a reference of a potential, and the shield 50 is also connected to the ground of the circuit board 40 via a component (for example, a coaxial connector described later). Accordingly, the entire shield 50 serves as a ground. In the present embodiment, a distance between the shield 50 that functions as a ground and the ground of the circuit board 40 can be reduced, and thus a difference between a shield potential and a circuit board potential can be reduced, resonance can be prevented, and the ground can be stabilized.

When the tubular shape of the lens barrel portion 30 is a first tubular shape and a part of the housing portion 60, for example, the large diameter tubular portion 61 is a second tubular shape, the housing portion 60 includes a bottom portion 66 at one end of the second tubular shape, and the second bottom surface portion 55 of the recessed portion 53 of the first bottom surface portion 51 of the shield 50 is in contact with the bottom portion 66 of the housing portion 60. Accordingly, the shield 50 can be stably disposed in the housing portion 60 (particularly, the large diameter tubular portion 61), and a component that maintains electrical connection with the outside can be easily disposed. An example of such a component is a coaxial connector described later.

Figure 7:
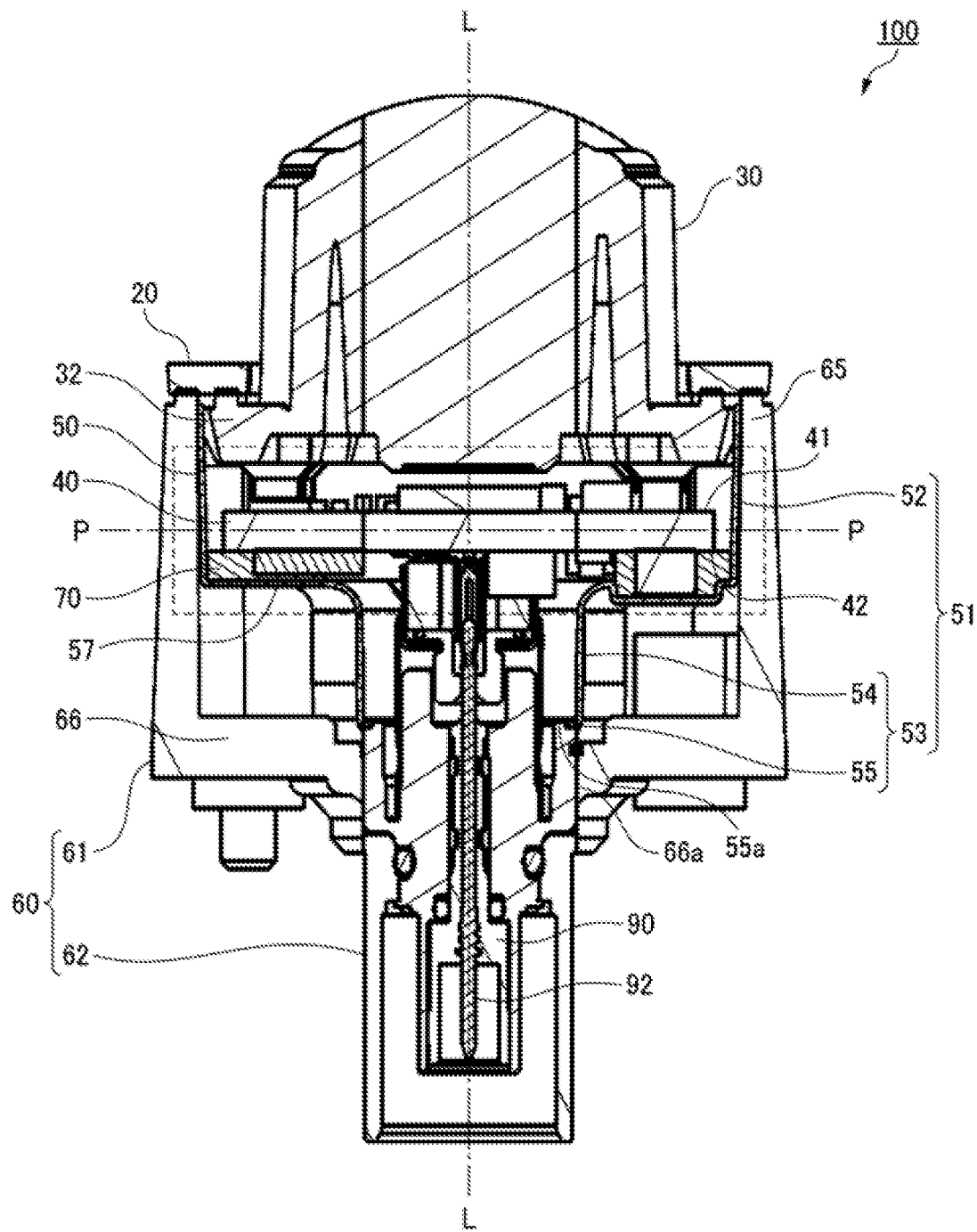
FIG. 7 is a cross-sectional view taken along a line VII-IVII in FIG. 6.
Figure 8:
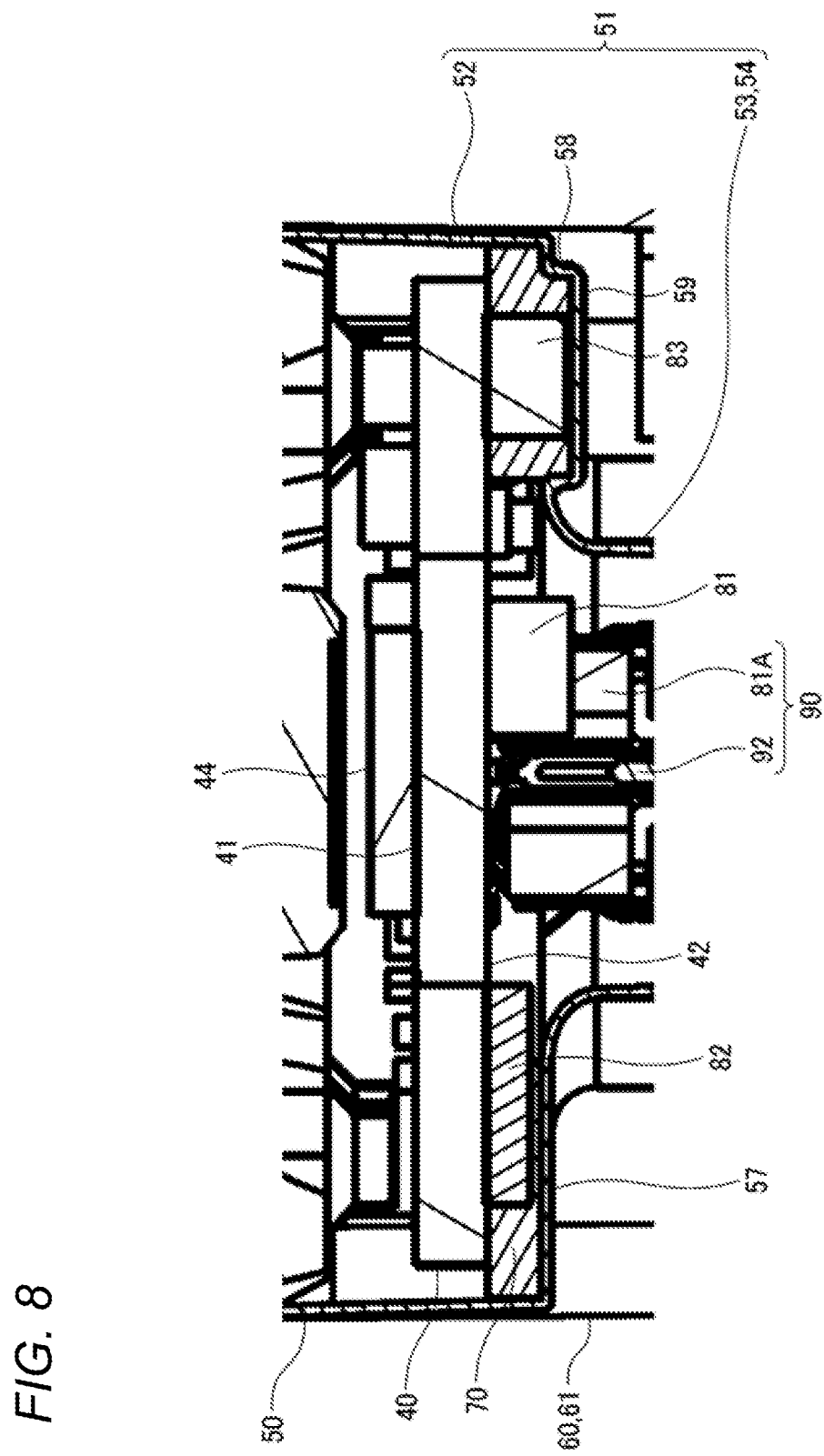
FIG. 8 is an enlarged view of a frame portion in FIG. 7.

FIG. 7 shows a cross section at a portion different from that in FIG. 4, and particularly shows a cross section taken along a bent line VII-VII in FIG. 6. FIG. 8 is an enlarged view of a frame portion in FIG. 7. As illustrated in this cross section, the second bottom surface portion 55 of the shield 50 has a first hole 55a, and the bottom portion 66 of the housing portion 60 has a second hole 66a. The first hole 55a is formed in the center of the second bottom surface portion 55, and the second hole 66a is formed in the center of the bottom portion 66. Accordingly, the first hole 55a and the second hole 66a are coaxial and continuous as one through hole.

As illustrated in FIG. 8 in which the frame portion in FIG. 7 is enlarged, when a first component 81A disposed on the second surface 42 of the circuit board 40 is a first connector, a second connector 92 electrically connected to the first connector is provided. As illustrated in FIG. 7, the second connector 92 is disposed across both the large diameter tubular portion 61 and the small diameter tubular portion 62 of the housing portion 60 and passes through the hole constituted by the first hole 55a and the second hole 66a.

The second connector 92 is disposed in the above-described hole, and is electrically connected to the first connector, which is the first component 81A, to electrically connect the circuit board 40 side of the shield 50 and an outer side of the bottom portion 66 of the housing portion 60. Accordingly, the electrical connection between the circuit board 40 and the outside can be ensured by the first connector and the second connector.

In the present embodiment, the first connector, which is the first components 81A, and the second connector 92 constitute a coaxial connector 90 coping with a high-frequency current. The second connector 92 is electrically connected to the shield 50 around the hole (first hole 55*a*). This makes it possible to easily ensure electrical connection between a high-frequency external power supply and the circuit board 40.

The outer side of the bottom portion 66 of the second connector 92 is connected to a connector terminal of a vehicle cable (not illustrated). Accordingly, the electrical connection with the connector terminal of the vehicle cable that is the external power supply can be easily ensured.

The first height of the first component 81 is larger than the distance between the second surface 42 of the circuit board 40 and the portion 57 other than the recessed portion of the first bottom surface portion 51. Accordingly, even in a case where the first component 81 has a large height and comes into contact with the shield 50 when being disposed at the portion 57 other than the recessed portion, the first component 81 can be disposed on the circuit board 40 in a position facing the second bottom surface portion 55 and interference with the shield 50 can be prevented.

Further, in the present embodiment, when the recessed portion 53 is a first recessed portion, the first bottom surface portion 51 of the shield 50 includes a second recessed portion 58 disposed inward of the peripheral edge. The second recessed portion 58 is formed by, for example, recessing the portion 57 other than the recessed portion, and such processing can be performed, for example, at the time of drawing a metal plate.

The circuit board 40 according to the present embodiment further includes a third component 83 disposed on the second surface 42 and having a third height larger than the height of the second component 82. The third component 83 faces a third bottom surface portion 59 of the second recessed portion 58. Accordingly, even when the height of the third component 83 is larger than the height of the second component, the third component 83 can be disposed on the circuit board 40 in a position facing the third bottom surface portion 59 while preventing interference with the shield 50.

In particular, in the present embodiment, the third height of the third component 83 is larger than a distance between the second surface 42 of the circuit board 40 and a portion other than the first recessed portion and the second recessed portion of the first bottom surface portion 51 of the shield 50. Accordingly, even when the height of the third component 83 is larger than the height of the second component 82, the third component 83 can be disposed on the circuit board 40 in a position facing the third bottom surface portion 59 while preventing interference with the shield 50. The third height of the third component 83 may be smaller than the distance between the second surface 42 of the circuit board 40 and the portion other than the first recessed portion and the second recessed portion of the first bottom surface portion 51 of the shield 50.

The third height of the third component 83 is smaller than the first height of the first component 81. Accordingly, even when the height of the third component 83 is larger than the height of the second component 82, if the height of the third component 83 is smaller than the height of the first component 81, the third component 83 can be disposed on the circuit board 40 in a position facing the third bottom surface portion 59 while preventing interference with the shield 50.

The first component 81 is desirably disposed on the second surface 42 of the circuit board 40 in a position closer to the optical axis L than the second component 82 is. Accordingly, the first component 81 having a large height can be disposed in a position close to the optical axis L at a long distance from the shield 50, and the second component having a small height can be disposed in a position apart from the optical axis L.

The vehicular camera 100 according to the present embodiment further includes the resin member 70. The resin member 70 is disposed between the second surface 42 of the circuit board 40 and the portion 57 other than the recessed portion of the first bottom surface portion 51 of the shield 50. The resin member 70 is in close contact with at least a part of the first component 81 and is in close contact with at least a part of the second component 82. Accordingly, heat generated from the circuit board 40 can be efficiently dissipated by the resin member 70. The resin member 70 may be in close contact with at least a part of the third component 83 or may enter the second recessed portion 58.

In FIG. 2, the resin member 70 is formed in advance in a shape that matches the space between the second surface 42 of the circuit board 40 and the portion 57 other than the recessed portion as much as possible. When assembling the vehicular camera 100, the resin member 70, which is a potting member, is viscous before a prescribed period elapses, and thus the resin member 70 deforms and comes into close contact with at least a part of the first component 81 and the second component 82 to be. The resin member 70 is cured after the prescribed time elapses. The resin member 70 may be a sheet material.

As illustrated in FIG. 5, the second side surface portion 54 of the recessed portion 53 of the first bottom surface portion 51 of the shield 50 has a tapered shape. A first cross section (cross section along a line C1-C1 in FIG. 5) of the second side surface portion 54 that is perpendicular to the optical axis L has a first cross-sectional area, and a second cross section (cross section along a line C2-C2 in FIG. 5) of the second side surface portion 54 that is perpendicular to the optical axis L and closer to the second bottom surface portion 55 than the first cross section is has a second cross-sectional area smaller than the first cross-sectional area. Accordingly, the shield 50 can be more easily formed by drawing or the like.

The present disclosure describes at least the following matters. Components corresponding to those in the above-described embodiment are shown in parentheses, but the present invention is not limited thereto.

(1) A vehicular camera (vehicular camera 100) according to the present disclosure includes:

- at least one lens (lens 10) disposed along an optical axis (optical axis L);
- a lens barrel portion (lens barrel portion 30) having a tubular shape and accommodating the at least one lens;
- a circuit board (circuit board 40) having a first surface (first surface 41) and a second surface (second surface 42) opposite to the first surface, the circuit board being disposed along a prescribed plane (prescribed plane P);
- an imaging element (imaging element 44) arranged on the first surface of the circuit board and disposed on the optical axis;
- a resin housing (housing portion 60) to which the lens barrel portion is fixed, the housing accommodating at least the circuit board; and
- a metal shield (shield 50) accommodated in the housing, wherein
- the shield is disposed along the prescribed plane and includes at least a first bottom surface portion (first bottom surface portion 51) facing the second surface of the circuit board,
- the first bottom surface portion of the shield includes a first side surface portion (first side surface portion 52)

surrounding the circuit board along a direction of the optical axis at a peripheral edge, and a recessed portion (recessed portion 53) disposed inward of the peripheral edge, the recessed portion of the first bottom surface portion of the shield includes a second bottom surface portion (second bottom surface portion 55) and a second side surface portion (second side surface portion 54) connecting the second bottom surface portion and the first bottom surface portion at a peripheral edge of the second bottom surface portion, the second bottom surface portion of the recessed portion of the first bottom surface portion of the shield is disposed farther from the circuit board than the first bottom surface portion of the shield, the circuit board includes a first component (first components 81, 81A) disposed on the second surface and having a first height and a second component (second component 82) disposed on the second surface and having a second height smaller than the first height, the first component is disposed in a position opposite to the second bottom surface portion of the recessed portion of the first bottom surface portion of the shield, and the second component is disposed in a position opposite to a portion other than the recessed portion (portion 57 other than the recessed portion) of the first bottom surface portion of the shield.

Accordingly, in the vehicular camera, a distance between the first bottom surface portion of the shield and the circuit board can be reduced, and noise resistance can be improved since radio waves are less likely to fly in. The shield functioning as a ground is adjacent to a ground of the circuit board, and thus a difference between a potential of the shield and a potential of the circuit board can be reduced, resonance can be prevented, and the ground can be stabilized.

(2) The vehicular camera (vehicular camera 100) according to the present disclosure is directed at the vehicular camera described in (1), wherein the first side surface portion, the portion other than the recessed portion of the first bottom surface portion, the second side surface portion of the recessed portion, and the second bottom surface portion of the recessed portion are continuously formed.

Accordingly, in the vehicular camera, the shield can be more easily formed by drawing or the like.

(3) The vehicular camera (vehicular camera 100) according to the present disclosure is directed at the vehicular camera described in (1), wherein the tubular shape of the lens barrel portion is a first tubular shape, a part of the housing has a second tubular shape, the housing includes a bottom portion (bottom portion 66) at one end of the second tubular shape, and the second bottom surface portion of the recessed portion of the first bottom surface portion of the shield is in contact with the bottom portion of the housing.

Accordingly, in the vehicular camera, the shield can be stably disposed in the housing, and a component that maintains electrical connection with the outside can be easily disposed.

(4) The vehicular camera (vehicular camera 100) according to the present disclosure is directed at the vehicular camera described in (3), wherein the first component disposed on the second surface of the circuit board is a first connector (first component 81A), the second bottom surface portion of the recessed portion of the first bottom surface portion of the shield and the bottom portion of the housing have holes (first hole 55a and second hole 66a), and the vehicular camera further comprises a second connector (second connector 92) disposed in the holes, the second connector being configured to electrically connect a circuit board side of the shield and an outer side of the bottom portion of the housing and electrically connect the first connector.

Accordingly, in the vehicular camera, the electrical connection between the circuit board and the outside can be ensured by the first connector and the second connector.

(5) The vehicular camera (vehicular camera 100) according to the present disclosure is directed at the vehicular camera described in (4), wherein the first connector and the second connector are coaxial connectors (coaxial connector 90), and the second connector is electrically connected to the shield around the holes.

Accordingly, in the vehicular camera, it is possible to easily ensure electrical connection between a high-frequency external power supply and the circuit board.

(6) The vehicular camera (100) according to the present disclosure is directed at the vehicular camera described in (4), wherein the second connector connects a connector terminal of a vehicle cable through the outer side of the bottom portion.

Accordingly, in the vehicular camera, the electrical connection with the connector terminal of the vehicle cable that is the external power supply can be easily ensured.

(7) The vehicular camera (vehicular camera 100) according to the present disclosure is directed at the vehicular camera described in (1), wherein the first height of the first component is larger than a distance between the second surface of the circuit board and the portion other than the recessed portion of the first bottom surface portion of the shield.

Accordingly, in the vehicular camera, even when the first component has a large height, the first component can be disposed on the circuit board in a position facing the second bottom surface portion and interference with the shield can be prevented.

(8) The vehicular camera (vehicular camera 100) according to the present disclosure is directed at the vehicular camera described in (1), wherein the recessed portion is a first recessed portion, the first bottom surface portion of the shield includes a second recessed portion (second recessed portion 58) inward of the peripheral edge, the circuit board includes a third component (third component 83) disposed on the second surface and having a third height larger than the second height of the second component, and the third component faces a third bottom surface portion (third bottom surface portion 59) of the second recessed portion.

Accordingly, in the vehicular camera, even when the height of the third component is larger than the height of the second component, the third component can be disposed on the circuit board in a position facing the third bottom surface portion while preventing interference with the shield.

(9) The vehicular camera (vehicular camera 100) according to the present disclosure is directed at the vehicular camera described in (8), wherein the third height of the third component is larger than a
distance between the second surface of the circuit board
and a portion other than the first recessed portion and
the second recessed portion of the first bottom surface
portion of the shield.

Accordingly, in the vehicular camera, even when the height of the third component is larger than the height of the second component, the third component can be disposed on the circuit board in a position facing the third bottom surface portion while preventing interference with the shield.

(10) The vehicular camera (vehicular camera 100) according to the present disclosure is directed at the vehicular camera described in (9), wherein the third height of the third component is smaller than the first height of the first component.

Accordingly, in the vehicular camera, even when the height of the third component is larger than the height of the second component, if the height of the third component is smaller than the height of the first component, the third component can be disposed on the circuit board in a position facing the third bottom surface portion while preventing interference with the shield.

(11) The vehicular camera (vehicular camera 100) according to the present disclosure is directed at the vehicular camera described in (1), wherein the first component is disposed on the second surface of the circuit board in a position closer to the optical axis than the second component is.

Accordingly, in the vehicular camera, the first component having a large height can be disposed in a position close to the optical axis at a long distance from the shield, and the second component having a small height can be disposed in a position apart from the optical axis.

(12) The vehicular camera (vehicular camera 100) according to the present disclosure is directed at the vehicular camera described in (1) further includes:

a resin member (resin member 70) disposed between the second surface of the circuit board and the portion other than the recessed portion of the first bottom surface portion of the shield, wherein the resin member is in close contact with at least a portion of the first component and in close contact with at least a portion of the second component.

Accordingly, in the vehicular camera, heat generated from the circuit board can be efficiently dissipated by the resin member.

(13) The vehicular camera (vehicular camera 100) according to the present disclosure is directed at the vehicular camera described in (1), wherein the second side surface portion of the recessed portion of the first bottom surface portion of the shield has a tapered shape, a first cross section of the second side surface portion that is perpendicular to the optical axis has a first cross-sectional area, and a second cross section of the second side surface portion that is perpendicular to the optical axis and closer to the second bottom surface portion than the first cross section is has a second cross-sectional area smaller than the first cross-sectional area.

Accordingly, in the vehicular camera, the shield can be more easily formed by drawing or the like.

Although the embodiment has been described above with reference to the accompanying drawings, the present disclosure is not limited to such an embodiment. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiment described above may be combined freely in a range without departing from the gist of the invention.

INDUSTRIAL APPLICABILITY

The present disclosure is useful for a vehicular camera that reduces a difference between a potential of a shield and a potential of a circuit board, makes radio waves less likely to fly in, and improves noise resistance.

What is claimed is:

1. A vehicular camera comprising:
   at least one lens disposed along an optical axis;
   a lens barrel portion having a tubular shape and accommodating the at least one lens;
   a circuit board having a first surface and a second surface opposite to the first surface, the circuit board being disposed along a prescribed plane;
   an imaging element arranged on the first surface of the circuit board and disposed on the optical axis;
   a resin housing to which the lens barrel portion is fixed, the housing accommodating at least the circuit board; and
   a metal shield accommodated in the housing, wherein
   the shield is disposed along the prescribed plane and includes at least a first bottom surface portion facing the second surface of the circuit board,
   the first bottom surface portion of the shield includes a first side surface portion surrounding the circuit board along a direction of the optical axis at a peripheral edge, and a recessed portion disposed inward of the peripheral edge,
   the recessed portion of the first bottom surface portion of the shield includes a second bottom surface portion and a second side surface portion, the second side surface portion connecting the second bottom surface portion and the first bottom surface portion at a peripheral edge of the second bottom surface portion,
   the second bottom surface portion of the recessed portion of the first bottom surface portion of the shield is disposed farther from the circuit board than the first bottom surface portion of the shield,
   the circuit board includes a first component disposed on the second surface and having a first height and a second component disposed on the second surface and having a second height smaller than the first height,
   the first component is disposed in a position opposite to the second bottom surface portion of the recessed portion of the first bottom surface portion of the shield, and
   the second component is disposed in a position opposite to a portion other than the recessed portion of the first bottom surface portion of the shield.

2. The vehicular camera according to claim 1, wherein the first side surface portion, the portion other than the recessed portion of the first bottom surface portion, the second side surface portion of the recessed portion, and the second bottom surface portion of the recessed portion are continuously formed.

3. The vehicular camera according to claim 1, wherein the tubular shape of the lens barrel portion is a first tubular shape, a part of the housing has a second tubular shape, the housing includes a bottom portion at one end of the second tubular shape, and the second bottom surface portion of the recessed portion of the first bottom surface portion of the shield is in contact with the bottom portion of the housing.

4. The vehicular camera according to claim 3, wherein
the first component disposed on the second surface of the circuit board is a first connector, the second bottom surface portion of the recessed portion of the first bottom surface portion of the shield and the bottom portion of the housing have holes, respectively, and the vehicular camera further comprises a second connector disposed in the holes, the second connector being configured to electrically connect a circuit board side of the shield and an outer side of the bottom portion of the housing and electrically connect the first connector.

5. The vehicular camera according to claim 4, wherein
the first connector and the second connector are coaxial connectors, and the second connector is electrically connected to the shield around the holes.

6. The vehicular camera according to claim 4, wherein
the second connector connects a connector terminal of a vehicle cable through the outer side of the bottom portion.

7. The vehicular camera according to claim 1, wherein
the first height of the first component is larger than a distance between the second surface of the circuit board and the portion other than the recessed portion of the first bottom surface portion of the shield.

8. The vehicular camera according to claim 1, wherein
the recessed portion is a first recessed portion, the first bottom surface portion of the shield includes a second recessed portion inward of the peripheral edge, the circuit board includes a third component disposed on the second surface and having a third height larger than the second height of the second component, and the third component faces a third bottom surface portion of the second recessed portion.

9. The vehicular camera according to claim 8, wherein
the third height of the third component is larger than a distance between the second surface of the circuit board and a portion other than the first recessed portion and the second recessed portion of the first bottom surface portion of the shield.

10. The vehicular camera according to claim 9, wherein
the third height of the third component is smaller than the first height of the first component.

11. The vehicular camera according to claim 1, wherein
the first component is disposed on the second surface of the circuit board in a position closer to the optical axis than the second component.

12. The vehicular camera according to claim 1, further comprising:

a resin member disposed between the second surface of the circuit board and the portion other than the recessed portion of the first bottom surface portion of the shield, wherein the resin member is in close contact with at least a portion of the first component and in close contact with at least a portion of the second component.

13. The vehicular camera according to claim 1, wherein
the second side surface portion of the recessed portion of the first bottom surface portion of the shield has a tapered shape, a first cross section of the second side surface portion that is perpendicular to the optical axis has a first cross-sectional area, and a second cross section of the second side surface portion that is perpendicular to the optical axis and closer to the second bottom surface portion than the first cross section has a second cross-sectional area smaller than the first cross-sectional area.

* * * * *